United States Patent [19]

Kent

[11] Patent Number: 4,916,382

[45] Date of Patent: Apr. 10, 1990

[54] SYSTEM FOR MAXIMIZING EFFICIENCY OF POWER TRANSFER

[75] Inventor: William A. Kent, Ft. Lauderdale, Fla.

[73] Assignee: Horner Equipment of Florida, Inc., Fort Lauderdale, Fla.

[21] Appl. No.: 151,100

[22] Filed: Feb. 1, 1988

[51] Int. Cl.⁴ ............................................. G05F 1/67
[52] U.S. Cl. ................................... 323/299; 323/906; 363/95
[58] Field of Search ...................... 323/299, 303, 906; 363/95, 97, 130, 135, 137

[56] References Cited

U.S. PATENT DOCUMENTS

| | | | |
|---|---|---|---|
| 3,949,782 | 4/1976 | Athey et al. | 361/394 |
| 4,580,090 | 4/1986 | Bailey et al. | 323/906 X |
| 4,614,879 | 9/1986 | Ault | 323/906 X |
| 4,644,256 | 2/1987 | Farias et al. | 323/906 X |
| 4,649,334 | 3/1987 | Nakajima | 323/906 X |
| 4,678,983 | 7/1987 | Rouzies | 323/906 X |

OTHER PUBLICATIONS

Roesler, "Solar Cell Power System with Peak Power Tracking and Utility Interface", 13th IEEE Photovoltaic Specialists Conference, 6/78, pp. 978–983.

Primary Examiner—Peter S. Wong
Assistant Examiner—Kristine Peckman
Attorney, Agent, or Firm—Clifford A. Poff

[57] ABSTRACT

A system for maximizing the efficiency of power transfer from a photovoltaic source to a load element, such as a fluid pump to circulate fluid in a swimming pool system. The system is operative to maximize the power output by the photovoltaic power source, or, alternatively, to maximize the amount of work performed by the load element. A microprocessor controller receives input information concerning the voltage and current levels of the electrical power generated by the photovoltaic source, and input information concerning the work performed by the load element. When the load element is a fluid pump, the input information includes the flow rate of the fluid pumped by the fluid pump. The controller generates an output signal causing a power convertor to increase the current of the signal output by the power converter until the output power is maximized, or, alternatively, until the efficiency of the work performed by the load element is maximized. The controller provides overload protection to the load element by responding to an appropriate sensor output with an appropriate control signal.

6 Claims, 3 Drawing Sheets

SYSTEM FOR MAXIMIZING EFFICIENCY OF POWER TRANSFER

BACKGROUND OF THE INVENTION

1. Field of the Invention

The present invention relates generally to power transfer systems, and, more particularly, to a system for maximizing the performance of a work producing load element such as a dyno electric machine.

2. Description of the Prior Art

As the availability and efficiency of photovoltaic cell sources has increased in recent years, applications utilizing such cells has increased. Because the power generating capability of solar cells is dependent upon ambient conditions, the power generating capability of the cells is at times limited. Various apparatus and methods have been developed to most efficiently utilize the generated power.

In order to most efficiently utilize the electrical power generated by an array of photovoltaic cells, it is desired to operate the system such that the maximum amount of power is supplied to the work producing load element, or to otherwise maximize the work performed by the load element.

While the present invention is not so limited, one example of a system which may be powered by electricity generated by photovoltaic cells is a system using a dyno electric machine to circulate fluid in a swimming pool. In such a system, a pump motor is supplied electrical energy to operate a pump which circulates the fluid in the swimming pool. A system for optimizing the pumping efficiency of the pump for any fluid medium particularly liquids would enhance the performance of the system.

It is therefore the object of the present invention to provide a system which maximizes the efficiency of power transfer of a direct current power supply, such as power supplied by an array of photovoltaic cells, to most efficiently operate a load element, such as, for example, dyno electric machine or a motor connected to a pump for fluid.

It is a further object of the present invention to provide a system to optimize the efficiency of a dyno electric motor as a work producing element.

SUMMARY OF THE PRESENT INVENTION

In accordance with the present invention, a system is disclosed for maximizing the performance of a work producing load element. The system includes a direct current power supply means for generating electrical power having first voltage and current characteristics. The direct current power supply means, may, for example, be comprised of an array of photovoltaic cells for converting solar energy to electrical power. A power converting means is coupled to the direct current power supply means for converting the electrical power generated thereby to electrical power having second voltage and current characteristics, and for supplying the electrical power having the second voltage and current characteristics to the load element. The power converting means may, depending upon the particular application, be comprised of a direct current to direct current convertor, a direct current to single phase alternating current convertor, or a direct current to 3-phase alternating current convertor. The electrical power output by the power converting means may be supplied to a dyno electric machine such as an electric motor converting electrical power to mechanical energy. A control means is coupled to the power converting means for selecting values of the second voltage and current characteristics. The control means is preferably constructed and utilized to controllably protect the motor or other load device in response to a control signal derived from a sensor. In one embodiment of the present invention, the control means measures the voltage and current levels generated by the direct current power supply means, calculates the magnitude of electrical power generated by the power supply means by multiplying the measured levels of the voltage and current, and generates and supplies a signal to the power converting means to cause the power converting means to increment the value of the second current characteristic until the magnitude of the electrical power output is maximized.

In an alternate embodiment of the present invention, the control means measures the voltage and current levels of the electrical power output by the power converting means, calculates the magnitude of the electrical power output by the power converting means by multiplying the measured levels of voltage and current, and generates and supplies a signal to the power converting means to cause the power converting mean to increase the value of the second current characteristic until the magnitude of the electrical power output is maximized.

In yet another embodiment of the present invention, the control means measures the amount of work performed by the load element, and supplies a signal to the power converting means to cause the power converting means to increase the value of the second current characteristic until the amount of work performed by the load element is maximized.

The principles of the present invention may be embodied to create a system for maximizing the performance of a pump for fluid, such as a pump utilized to circulate fluid in a swimming pool. The system includes a direct current power supply means, such as the array of photovoltaic cells, for generating electrical power having first voltage and current characteristics. A power converting means coupled to the power supply means converts the electrical power generated by the power supply means to electrical power having second voltage and current characteristics. The pump means can include a dyno electric machine such as an electric motor. A motor is electrically connected to the power converting means to receive the electrical power output by the power converting means having the second voltage and current characteristics. The motor is mechanically coupled to operate a pump for fluid medium. A control means is coupled to the power converting means for selecting values for the second voltage and current characteristics. The motor means may, for example, be comprised of a 3-phase alternating current motor, and the power converting means may, for example, be comprised of a direct current to 3-phase alternating current convertor. The control means selects the value of the second current characteristic value of the second current characteristic to be generated by the power converting means based upon information concerning the power level of the electrical power generated by the power supply, the power level of the electrical power output by the power converting means, the amount of work performed by the motor means, or by measurement of the flow rate of the fluid acted upon by the pump means.

BRIEF DESCRIPTION OF THE DRAWINGS

The present invention may be better understood when read in light of the accompanying drawings in which.

DESCRIPTION OF THE PREFERRED EMBODIMENT

Photovoltaic power supplies utilized to generate electrical power are typically formed of a plurality of discrete solar cells electrically connected to form an array of solar cells. Referring to the graph of FIG. 1, there is illustrated the characteristic curve of a typical solar cell array. The characteristic curve 10 is an exponential curve and may be mathematically described by the equation:

$$I = mI_o(e^{\frac{v}{nvT} - 1}) - mIp$$

where I=cell array anode to cathode current,
m=the number of solar cells positioned in parallel,
Io=the solar cell reverse saturation current,
n=the number of parallel units in series,
$V_T$=0.026 volts at 80 degrees F,
V=the array voltage from anode to cathode, and
Ip=the elementary cell photo current.

Figure 1:
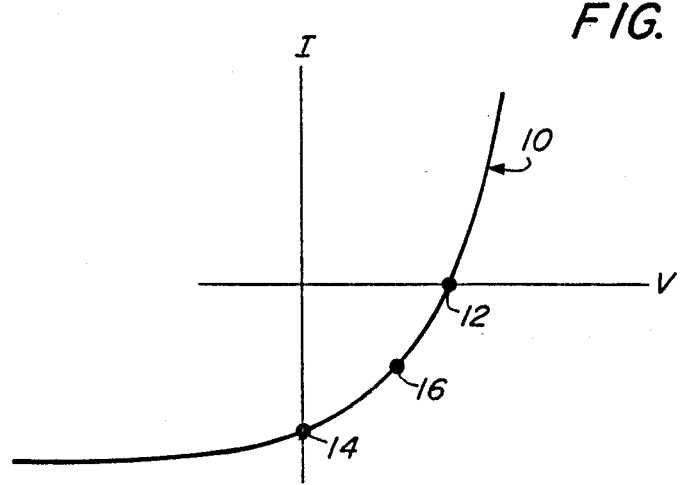
FIG. 1 is a graph illustrating the characteristic curve of a typical array of photovoltaic cells.

The open circuit voltage of the solar cell array, illustrated on the graph of FIG. 1 at point 12, may be derived by setting the above equation equal to zero (i.e., I=0). In a similar manner, the short circuit current of the array, illustrated on the graph of FIG. 1 at point 14, may be derived by setting V in the above equation equal to 0. To determine the power generated by the cell array at any operating point along the characteristic curve 10, the specific values for the voltage and the current at that point may be multiplied together. For any particular characteristic curve 10, a particular value of voltage V and current I exists, at which point a maximum power is generated. Power is the product of the voltage and current. In the graph of FIG. 1, maximum power is obtained at point 16 on the characteristic curve 10.

Because the power generated by the solar cell array is equal to the voltage multiplied by the current, the power generated by the solar cell array may be derived from the above equation by multiplying both sides of the equation by a voltage, V to yield:

$$P = V[mI(e^{\frac{v}{nvT} - 1}) - mIp]$$

By differentiating the new equation with respect to voltage, the point of maximum power output 16 may be found by then solving the resultant transcendental equation for voltage V, i.e.:

$$dP/dV = mI_o e^{\frac{v}{nvT}} (1 + \frac{v}{nvT}) - m(I_o + I_p)$$

Figure 2:
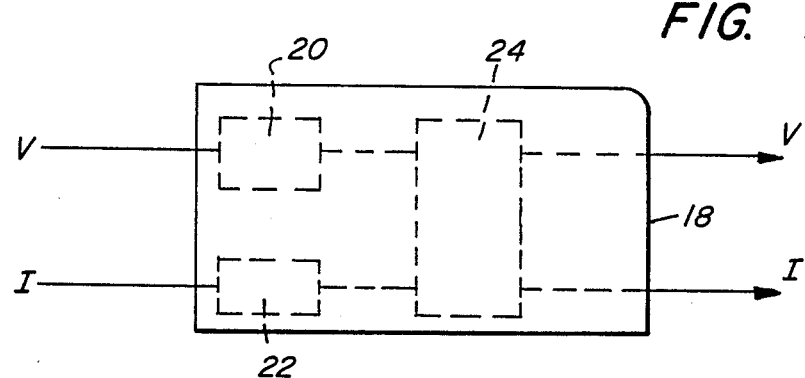
FIG. 2 is a block diagram of a controller utilized by the present invention.

Referring now to FIG. 2, there is illustrated a controller 18 which, when input values of voltage V and current I, solves the above transcendental expression to determine a desired voltage V to most efficiently utilize the power generated by an array of solar cells. Controller 18 is comprised of analog to digital convertors 20 and 22 which convert analog inputs of voltage and current, respectively, to corresponding digital values. The digitized signals generated by convertors 20 and 22 may be input to a microcomputer 24 which is programmed to solve the transcendental expression. A preferred method for solving the transcendental expression with a digital microcomputer 24 is one in which initial measured values of voltage and current are utilized to calculate the power generated by such values. The measured value of current is incrementally increased, and a successive value of power is calculated. Incremental increases in the value of the current continues until a maximum value of power is determined.

Figure 3:
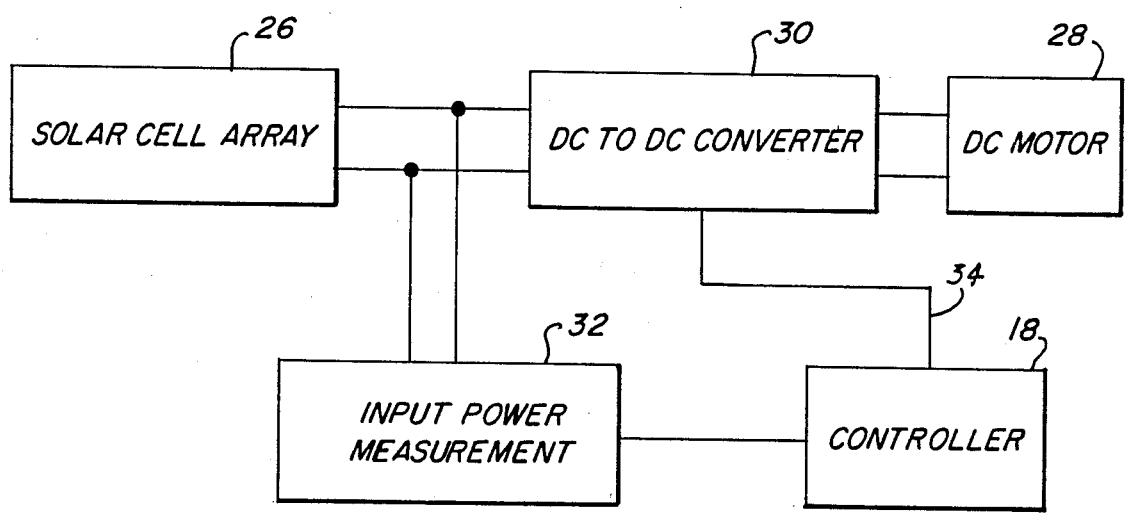
FIG. 3 is a block diagram of a first embodiment of the present invention in which a load element forming a dyno electric machine supplied with electrical power, wherein selection of the characteristics of the electrical power to maximize the performance of the machine is based upon the characteristics of the power generated by a power supply.

Illustrated in FIG. 3 is a block diagram of a circuit which includes controller 18 in order to maximize the power transfer between an array of solar cells 26 and a dyno electric machine forming a load element such as a D-C motor 28. A conventional D-C to D-C convertor 30 is positioned to receive the electrical power generated by the solar cells 26 and provides the D-C motor 28 direct current power having voltage and current characteristics such that the output power of the solar cell array 26 is maximized. In the embodiment of FIG. 3, controller 18 receives the values of voltage and current output by the solar cell array 26. Measurement of these quantities may be made by any conventional means, such measurement illustrated in the figure by block 32. Once the value of the power output by the solar cell array 26 is computed, controller 18 generates an output signal on line 34 which is supplied to convertor 30 to cause the current of the output signal generated by convertor 30 to be increased until the maximum power output from the solar cell array 26 has been obtained.

Figure 4:
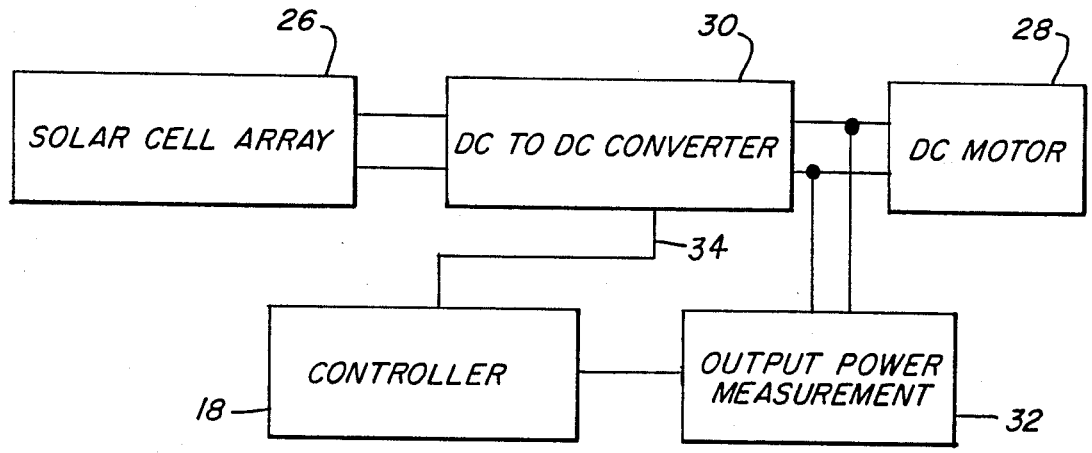
FIG. 4 is a block diagram of a second embodiment of the present invention in which a load element forming a dyno electric machine supplied electrical power, wherein selection of the characteristics of the electrical power to maximize the performance of the machine is based upon the characteristics of the electrical power output by a power converter in a typical feedback loop fashion.

Referring now to the illustration of FIG. 4, there is shown a block diagram of a circuit having an alternative configuration which also allows controller 18 to maximize the power transfer between an array of solar cells 26 and dyno electric machine forming a load element. Again, the dyno electric machine forming is illustrated as a D-C motor 28. D-C to D-C convertor 30 is positioned to receive the electrical power generated by the solar cells 26 and provides the D-C motor 28 direct current power having voltage and current characteristics such that the output power of the convertor 30 is maximized. In the embodiment of FIG. 4, controller 18 receives values of the voltage and current of the signal output by the convertor 30. Measurement of these quantities may be made by any conventional means, such measurement illustrated in the figure by block 32. Once the value of the power output by the convertor 30 is computed, the controller 18 generates an output signal on line 34 which is supplied to convertor 30 to cause the current characteristic of the signal output by convertor 30 to be incrementally increased until the power output by the convertor 30 is maximized.

Figure 5:
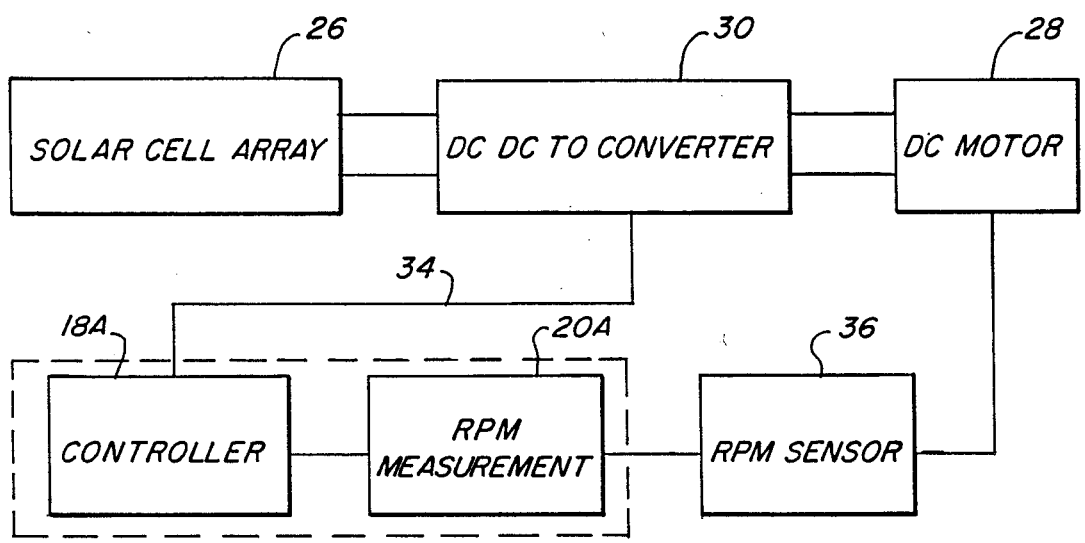
FIG. 5 is a block diagram of a third embodiment of the present invention in which a load element forming a dyno electric machine supplied electrical power wherein selection of the characteristics of the electrical power to maximize the performance of the machine is based upon the amount of work performed by the machine.

FIG. 5 illustrates a block diagram of another circuit configuration in which controller 18 is connected to maximize the performance of an electrical system powered by an array of solar cells 26. Once again, the dyno electric machine is illustrated as D-C motor 28. D-C to D-C convertor 30 is positioned to receive the electrical power generated by the solar cells 26 and provides the D-C motor 28 direct current power having second voltage and current characteristics. In this embodiment, the efficiency of the system is measured by the work performed by the D-C motor 28. A sensor 36, such as an RPM sensor, measures the work performed by the D-C motor 28. This measurement is supplied to controller 18A, which is similar to controller 18 of FIG. 2, with the addition of an analog to digital convertor 20A to convert the analog signal generated by sensor 36 to a corresponding digital value. Once the amount of work performed by D-C motor 28 is computed, controller 18A generates an output signal on line 34 which is supplied to convertor 30 to cause the current characteristics of the output signal of convertor 30 to be increased until the amount of work performed by D-C motor 28 is maximized.

Figure 6:
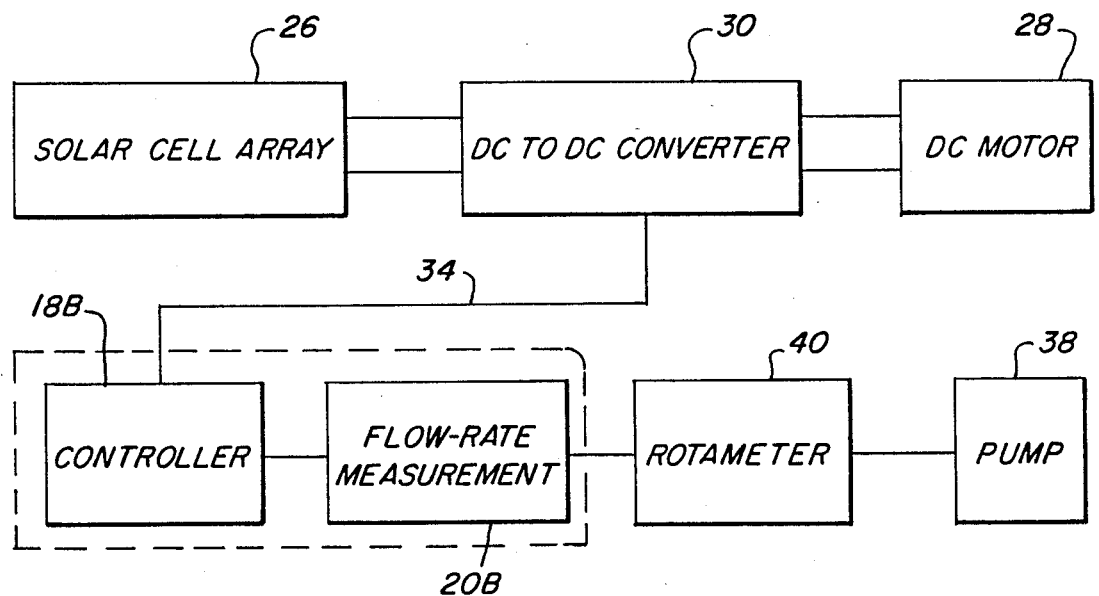
FIG. 6 is a block diagram of a specific embodiment of the present invention in which a D-C motor comprises a dyno electric machine, with the motor operating a pump, and characteristics of the electrical power being selected based upon measurement of the fluid flow generated during operation of the pump.

Referring now to the illustration of FIG. 6, there is illustrated a one further embodiment of the present invention in which the D-C motor 28 operates pump 38. In this embodiment, the flow rate of a fluid generated by operation of pump 38 is utilized to define efficiency of the system. A rotameter 40 senses the flow rate of the fluid pumped by pump 38 and supplies a signal indicative of thereof to controller 18B. Once the value of the flow rate is computed, controller 18B generates an output signal on line 34 which is supplied to convertor 30 to cause the current characteristics of the output signal of convertor 30 to be increased until the flow rate generated by pump 38 is maximized.

Figure 7:
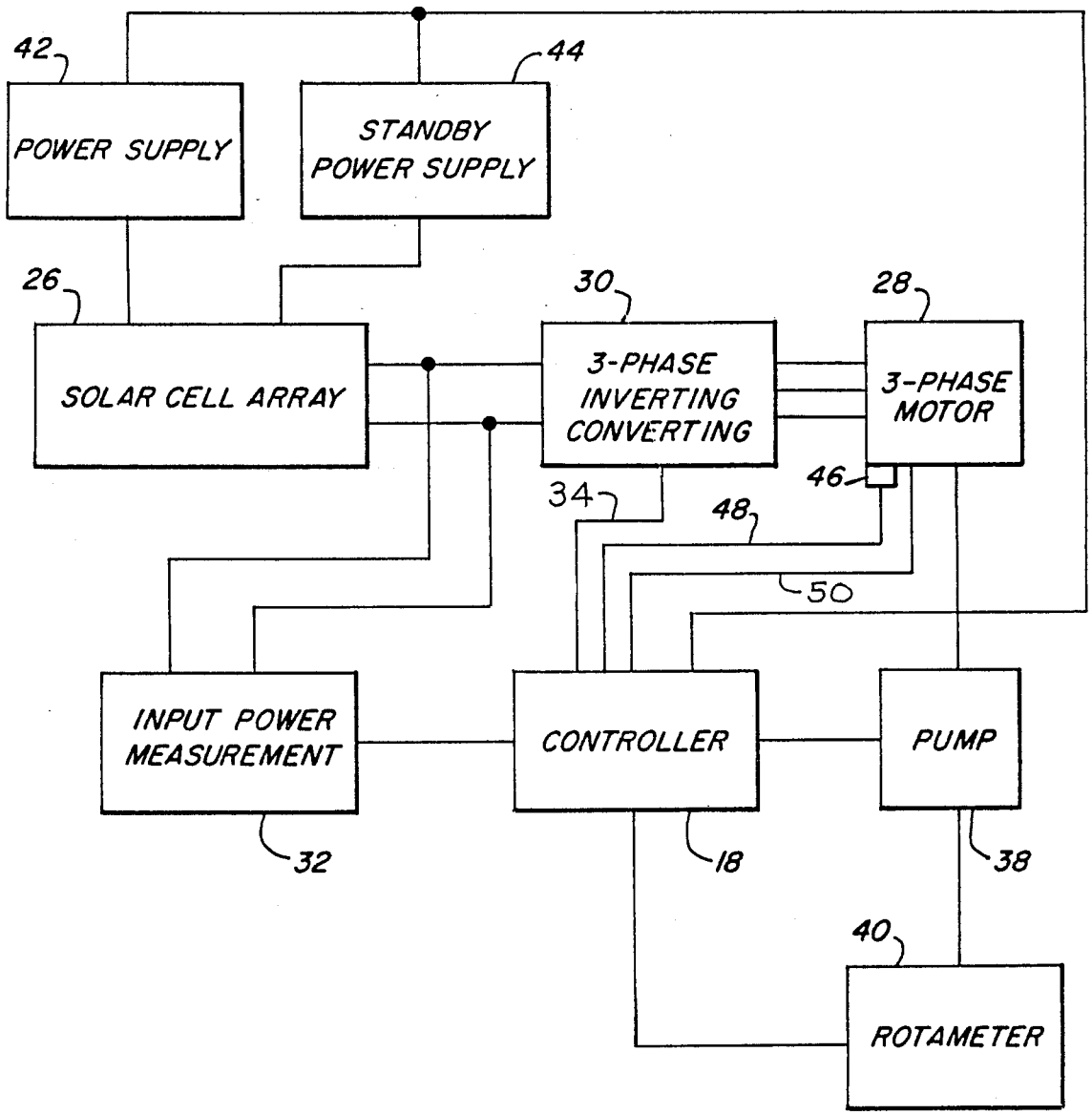
FIG. 7 is a block diagram illustrating a further embodiment of the present invention in which a 3-phase electrical motor operates a pump to pump, a fluid such as that of a circulation system of a swimming pool.

Illustrated in FIG. 7 is an embodiment of the present invention in which electrical power generated by an array of photovoltaic cells provides electrical power to a dyno electric machine comprised of a 3-phase motor to drive in this embodiment a fluid pump in order to circulate fluid in a swimming pool. The controller 18 functions to either maximize the input power of the solar cell array 26, similar to the embodiment illustrated in FIG. 3, or alternatively, to maximize the flow rate of the fluid pumped by pump 38. In the embodiment of FIG. 7, convertor 30 is a D-C to 3-phase A-C inverting convertor which converts the D-C electrical power generated by the solar cell array 26 to 3-phase alternating current power for supplying 3-phase alternating current to the 3-phase motor comprising a dyno electric machine. By altering the frequency of the electrical power supplied to the motor 28, the speed of the motor 28 may be varied.

The solar cell array 26 also charges power supply 42 and stand-by power supply 44 which provides electrical power to controller 18. Power supply 42 and stand-by power supply 44 may, for example, be comprised of nickel cadmium batteries.

In operation, when the solar cell array 26 generates a sufficient amount of electrical power to operate motor 28, the controller 18 supplies a signal on line 50 to the motor 28 to allow the motor 28 to start. Operation of motor 28 causes pump 38 to circulate fluid throughout the swimming pool circulation system. In the embodiment of FIG. 7, the controller 18 operates to either maximize the power supplied to the motor 28, or to maximize the flow rate of the fluid circulating through the system. When a selection is made to control the system to provide the motor 28 with maximum power, the controller 18 receives values of voltage and current of the direct current electrical power generated by the solar cell array 26, and generates a signal on line 34 causing the current of the output signal of the convertor 30 to increase, and, in turn, causing the rotational speed of the motor 28 to increase. Controller 18 causes the convertor 30 to incrementally increase the output signal current until the rotational speed of the motor 28 decreases. At this point, maximum electrical power is supplied to the motor 28.

Alternatively, when the system is selected to operate the maximum flow rate of the fluid, controller 18 receives signals from rotameter 40, and generates a signal on line 34 to be supplied to the convertor 30, causing the convertor 30 to incrementally increase the current of the output signal supplied to motor 28. The output current of the convertor 30 is caused to incrementally increase until the flow rate of fluid, as measured by the rotameter 40, reaches a maximum amount.

Further illustrated in FIG. 7 is a performance sensor 46, such as a temperature sensor positioned proximate to motor 28. The performance sensor provides information as in the form of a corresponding electrical signal, to the protection of the motor 28 or other form of a dyno electric machine from overheating. As shown in FIG. 7, signals generated by sensor 46 are supplied to controller 18 to allow the controller to make appropriate adjustments in the event that motor 28 overheats.

While the present invention has been described in connection with the preferred embodiments of the various figures, it is to be understood that other similar embodiments may be used or modifications or additions may be made to the described embodiment for performing the same functions of the present invention without deviating therefrom. Therefore, the present invention should not be limited to any single embodiment, but rather construed in breadth and scope in accordance with the recitation of the appended claims.

What I claim is:

1. A solar pumping system for pumping a fluid, including:

an array of photovoltaic cells for generating direct current electrical power having first voltage and current characteristics;

power converting means coupled to the array of photovoltaic cells for converting the first voltage and current characteristics of the electrical power to electrical power having second voltage and current characteristics;

motor means coupled to receive said electrical power having said second voltage and current characteristics;

pump means actuated by operation of the motor means for pumping fluid;

control means for selecting values for the second voltage and current characteristics, and for controlling said power converting means and means for delivering to said control means signals indicative of values of the first voltage and current characteristics and signals indicative of flow rates of the fluid pumped by the pump means to allow the control means to select optimal values of the second voltage and current characteristics.

2. The system of claim 1 wherein said control means includes means for generating a signal effecting a change in the overheating condition of said motor for effecting a change in the operation of the motor to reduce any overheating.

3. The system of claim 1 wherein said control means computes the point of maximum source output by solving the following equation for the voltage v:

$$dP/dV \times mI_o e^{V/nVT}(1+V/nVT-m(I_o+I_p)$$

where
I = cell array anode to cathode current,
m = the number of solar cells positioned in parallel,
$I_o$ = the solar cell reverse saturation current,
n = the number of parallel units in series,
$V_T$ = 0.026 volts at 80 degrees F,
V = the array voltage from anode to cathode, and
$I_p$ = the elementary cell photo current.

4. The system of claim 3, wherein said control means includes a digital microcomputer means adopted to receive inputs representing said first measured values of voltage and current for calculating the power generated by such values, and wherein said computer means includes means for incrementally increasing the first measured value of current to thereby calculate a successive value of the power, said calculation of incremental increase of the value of current being continued until a maximum value of the power is determined.

5. A solar pumping system for circulating water in a swimming pool, including:

an array of photovoltaic cells for generating direct current electrical power having direct current voltage and current characteristics;

direct current to three-phase alternating current converter coupled to the array of photovoltaic cells for converting the direct current voltage and current characteristics of the electrical power to three-phase alternating current electrical power having alternating current voltage and current characteristics;

three-phase electric motor means coupled to receive said three-phase alternating current electrical power;

pump means actuated by operation of the three-phase motor means for circulating water;

first measuring means for measuring magnitudes of the direct current electrical power;

second measuring means for measuring the amount of water circulated by the pump means; and control means coupled to receive values measured by said first and said second measuring means, respectively, and for supplying signals to the direct current to three-phase alternating current converter to cause the converter to increment the alternating current characteristic until the magnitude of the electrical power output is maximized.

6. A system for maximizing the performance of a fluid pump, including:

direct current power supply means for generating electrical power having first voltage and current characteristics;

power converting means coupled to the power supply means for converting the said first voltage and current characteristics of the electrical power to electrical power having second voltage and characteristics;

motor means for operating a pump, said motor means being electrical coupled to the power converting means to receive electrical power having said second voltage and current characteristics;

control means for selecting means for the second voltage and current characteristics;

said control means includes means for measuring the amount of fluid flow per unit of time pumped by said pump, and generating and supplying a signal to the power converting means to cause the power converting means to increase the value of the second current characteristics until the flow rate of the fluid pumped by the pump is maximized.

* * * * *